United States Patent
Bakhtazad et al.

(10) Patent No.: US 10,602,119 B1
(45) Date of Patent: Mar. 24, 2020

(54) SYSTEM AND METHOD FOR MULTIPLEXING MIPI MULTISPECTRAL IMAGING DEVICES

(71) Applicant: A & L Canada Laboratories Inc., London (CA)

(72) Inventors: Aref Bakhtazad, London (CA); Jayshri Sabarinathan, London (CA); Himanshu Shrinkhal, London (CA); Zahra Ataee, London (CA); Nicholas Scott Mitchell, London (CA); Greg Patterson, London (CA); Ata Haddadi, London (CA); Bo Shan, London (CA)

(73) Assignee: A & L Canada Laboratories Inc., London (CA)

( * ) Notice: Subject to any disclaimer, the term of this patent is extended or adjusted under 35 U.S.C. 154(b) by 0 days.

(21) Appl. No.: 16/416,366

(22) Filed: May 20, 2019

(51) Int. Cl.
| | |
|---|---|
| *G05B 15/00* | (2006.01) |
| *H04N 9/89* | (2006.01) |
| *H04N 13/167* | (2018.01) |
| *G06F 1/10* | (2006.01) |
| *H04N 5/232* | (2006.01) |
| *H04N 5/225* | (2006.01) |

(52) U.S. Cl.
CPC .............. *H04N 13/167* (2018.05); *G06F 1/10* (2013.01); *H04N 5/2258* (2013.01); *H04N 5/23229* (2013.01)

(58) Field of Classification Search
None
See application file for complete search history.

(56) References Cited

U.S. PATENT DOCUMENTS

| | | | | |
|---|---|---|---|---|
| 5,475,441 | A * | 12/1995 | Parulski | H04N 1/2112 348/158 |
| 6,282,462 | B1 * | 8/2001 | Hopkins | G06T 1/0007 348/314 |
| 2004/0022516 | A1 * | 2/2004 | Yamashiro | G08B 13/1961 386/223 |

FOREIGN PATENT DOCUMENTS

| | | |
|---|---|---|
| CN | 202818422 U | 3/2013 |
| CN | 204442534 U | 7/2015 |
| CN | 206472223 U | 9/2017 |
| CN | 107623809 A | 1/2018 |
| CN | 207039753 U | 2/2018 |

\* cited by examiner

*Primary Examiner* — Sath V Perungavoor
*Assistant Examiner* — Tyler B Edwards
(74) *Attorney, Agent, or Firm* — Kusner & Jaffe

(57) ABSTRACT

It is contemplated that the present invention can provide methods and systems for the near-simultaneous frame acquisition from multiple cameras. This can be achieved in two different ways. If the cameras are set to work in triggering mode, the triggering of a first camera and a subsequent camera are adjusted by overlapping the trigger signals and image communication control signals of each camera in order to capture near-simultaneous images from each of the cameras. If the cameras are in video mode, they will be kept synchronous by using a common clock and starting them at the same time. As each camera generates frames, individual, corresponding frames are sampled from each camera in a sequential manner upon receiving a triggering signal. In this way, near simultaneous images can be sampled and saved from multiple cameras in video mode.

20 Claims, 14 Drawing Sheets

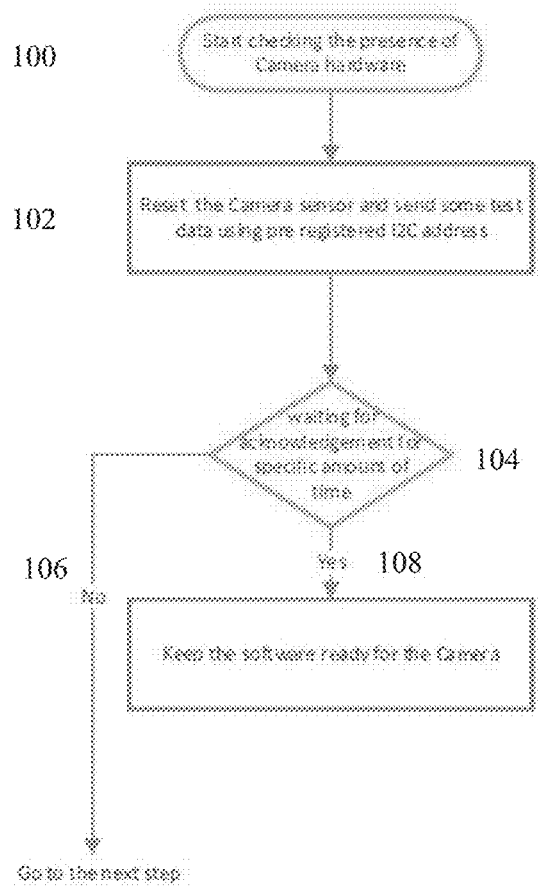
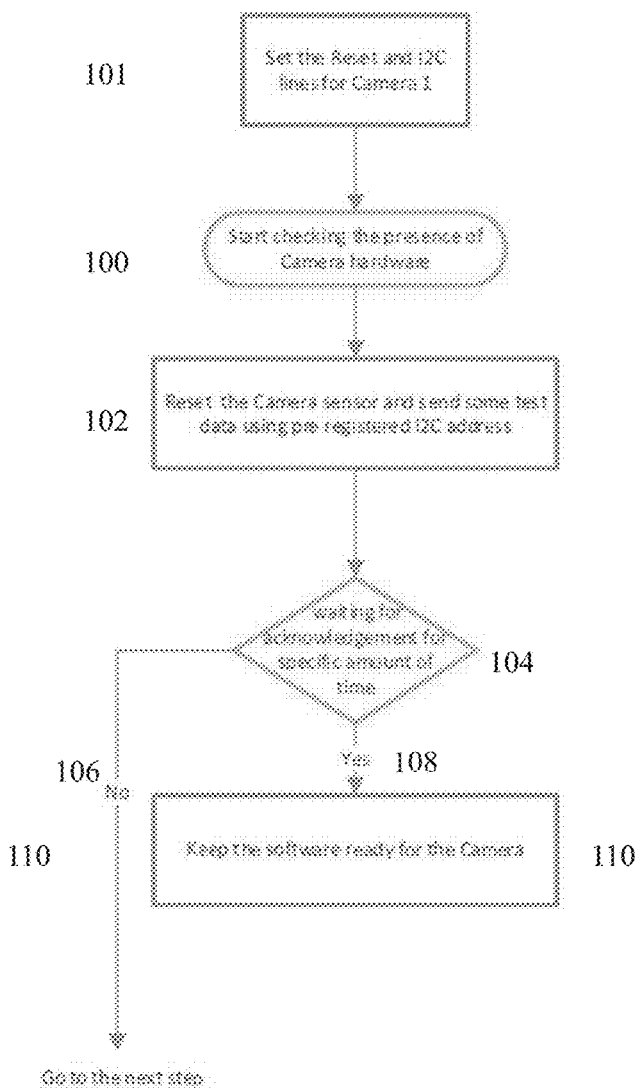
Figure 8A                    Figure 8B

SYSTEM AND METHOD FOR MULTIPLEXING MIPI MULTISPECTRAL IMAGING DEVICES

FIELD OF THE INVENTION

The present invention relates to methods and systems adapted for coordinating the operation of multiple imaging devices. More specifically, in at least one embodiment the present invention relates to electrical control systems and associated software for managing multiple digital cameras, that are used in connection with multispectral imaging systems in unmanned aerial vehicles.

BACKGROUND OF THE INVENTION

The proliferation of portable, lightweight and high-quality digital cameras (and their attendant electronic control systems) has naturally led to the incorporation of these devices in a wide variety of applications that would have historically been considered unfeasible given space, power consumption and other practical constraints.

Similarly, advances in mobile electronics have made remotely-controlled unmanned aerial vehicles ("UAVs" and commonly referred to as drones) more prevalently available. A common UAV configuration includes multiple small, electrically operated, vertically or horizontally-oriented propellers placed at the center or near the distal edges of the UAV's body. The combination of these improved UAV's with lightweight and high-quality digital cameras has led to a proliferation of new recreational and commercial applications for the resulting high-quality UAV photography that can be obtained with these arrangements.

Typically, a digital camera that is mounted on a UAV has a dedicated image processing unit to control triggering, image acquisition and image transfer, among various other control functions that are required to operate a digital camera that is mounted to the moving vehicle in a remote fashion. However, in some applications, multiple digital cameras are mounted on a single UAV in order to obtain a number of simultaneous or near-simultaneous images wherein each image captures a different spectral range. Such applications are commonplace in military, security and agricultural applications, to mention a few.

However, it will be readily appreciated that given the limitations on current battery technology, it is desirable to keep the electronic components of a UAV as lightweight and energy efficient as possible in order to minimize the UAV's power consumption and prolong the UAV's available flight time. As such, in multiple camera configurations it is desirable to minimize the electrical hardware weight and power consumption. More specifically, it would be desirable to limit the number of separate image processing units that are required to operate multiple digital cameras, and as a result also limiting the overall size of the circuit board that is required for the operation of the UAV.

Accordingly, there is need for systems and methods adapted to minimize the number of image processors required to operate multiple digital cameras while minimizing the overall delay between the trigger signal for each of the multiple digital cameras in order to ensure near-simultaneous images are captured by each of the multiple digital cameras.

SUMMARY OF THE INVENTION

In at least one embodiment, it is contemplated that the present invention can provide systems and methods adapted to minimize the number of image processors required to operate multiple digital cameras while minimizing the overall delay between the trigger signals for each of the multiple digital cameras in order to ensure an identical (or near-identical) image is captured by each of the multiple digital cameras.

Specifically, in one embodiment it is contemplated that the present invention can provide methods and systems for triggering a first camera and a subsequent camera in order to capture near-simultaneous images through a single image processing unit.

In one embodiment, it is contemplated that methods and systems are provided for coordinating the respective image communication links and trigger links for a plurality of cameras arranged in a multiplexed format through a single image processing unit.

In at least one embodiment wherein the cameras are in a triggering mode, it is contemplated that at a first trigger signal associated with a first camera and a subsequent trigger signal associated with a subsequent camera are respectively overlapped with a first image communication control signal that is associated with that first camera and a second image communication control signal associated with the second camera, such that following the initiation of a first trigger signal, a first image communication control signal, a first exposure period and a first data transmission link, all associated with the first camera, a subsequent trigger signal and subsequent exposure period is initiated prior to the termination of the first communication control signal and first data transmission link.

In at least one embodiment, it is contemplated that the present invention provides a method of controlling a plurality of cameras in triggering mode to obtain a plurality of near identical images, the method including the steps of generating at first least a first trigger signal and a second trigger signal in response to a main trigger signal, the first trigger signal associated with a first camera in triggering mode and the second trigger signal associated with a second camera in triggering mode, the first trigger signal having a starting point and an ending point, the second trigger signal having a starting point and an ending point, receiving the first trigger signal over a first trigger signal link between the first camera and a processing unit, establishing a first image communication control signal associated with the first camera between the first camera and the processing unit over a first communication control signal link, the first image communication control signal having a starting point and an ending point, establishing a first exposure period associated with the first camera, first exposure period having a starting point and an ending point, and establishing a first data transmission link associated with the first camera between the first camera and the processing unit, the first data transmission link having a starting point and an ending point, such that following the starting point of the first trigger signal, the starting point of the first image communication control signal, the starting point of the first exposure period and the starting point of the first data transmission link, receiving the second trigger signal, and establishing a second exposure period associated with a second camera prior to the ending point of the first communication control signal and the ending point of the first data transmission link.

In at least one embodiment, it is contemplated that the present invention provides a system for controlling a plurality of cameras in triggering mode to obtain a plurality of near identical images, the system including a processing unit, and a plurality of cameras, each of the plurality of cameras in triggering mode, such that the processing unit is electrically connected to each of the plurality of cameras by way of a trigger control signal link, a reset signal link, a switch control signal link, an image communication signal link, and a camera control signal link.

In another embodiment wherein the cameras are in a video mode, it is contemplated that for cameras in video modes a first frame can be sampled from a first set of frames obtained by a first camera and a second frame can be sampled from a second set of frames obtained by a second camera such that the first frame and the second frame represent two near identical images captured by two separate cameras in video mode.

In at least one embodiment, it is contemplated that the present invention provides a method of controlling a plurality of cameras in video mode to obtain a plurality of near identical images, the method including the steps of synchronizing at least a first camera and at least a second camera with an external clock, establishing a first image communication link between the first camera and a processing unit, sampling a first frame from a first set of frames obtained by a first camera in video mode, the first frame corresponding to a first time, establishing a second image communication link between the second camera and the processing unit, sampling a second frame a second set of frames obtained by a second camera in video mode, the second frame corresponding to a first time, such that the first time and the second time are sufficiently equivalent such that the first image is near identical to the second image.

In at least one embodiment, it is contemplated that the present invention provides a system for controlling a plurality of cameras in video mode to obtain a plurality of near identical images, the system including a processing unit, and a plurality of cameras, each of the plurality of cameras in video mode, such that the processing unit is electrically connected to each of the plurality of cameras by way of a trigger control signal link, a reset signal link, a switch control signal link, an image communication signal link, an external clock signal link and a camera control signal link.

BRIEF DESCRIPTION OF THE DRAWINGS

The specification of the present invention will be better understood when read in connection with the following Figures, in which:

FIG. 8A is a flowchart of one embodiment of a procedure for recognizing camera hardware in accordance with at least one embodiment of the present invention;

FIG. 8B is a flowchart of another embodiment of a procedure for recognizing camera hardware in accordance with at least one embodiment of the present invention;

DETAILED DESCRIPTION OF THE INVENTION

Figure 1A:
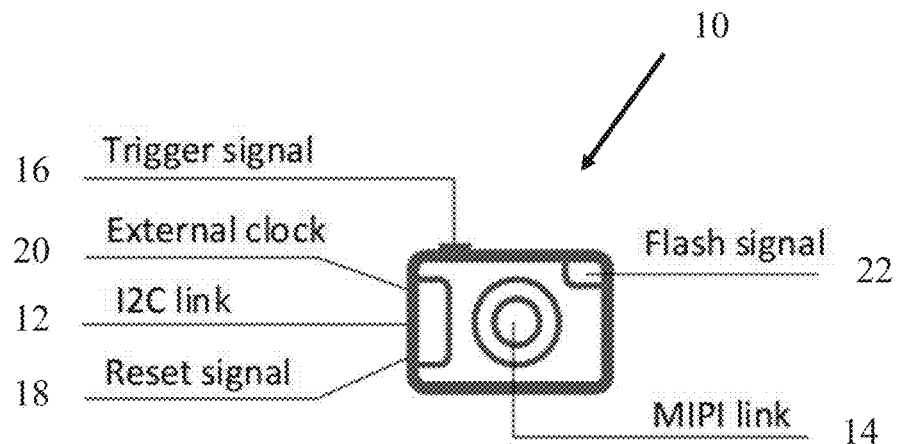
FIG. 1A is a diagram of one embodiment of a digital camera with a typical input/output signals in accordance with at least one embodiment of the present invention.

In at least one embodiment, it is contemplated that the present invention can provide systems and methods adapted to minimize the number of image processing units required to operate multiple digital cameras while minimizing the overall delay between the trigger signal for each of the cameras in order to ensure a near-identical image is captured by each of the multiple cameras. Specifically, in one embodiment it is contemplated that the present invention can provide systems and methods for the near-simultaneous triggering of multiple cameras through a single image processing unit.

As will be readily appreciated by the skilled person, it is contemplated that the present methods and systems can be practiced in a variety of ways and using any number of suitable individual electronic components that will be readily apparent to those skilled in the art.

Moreover, it is contemplated that the present invention can be constructed pursuant to any suitable existing or future circuit design standard, including but not limited to inter-integrated circuit ("I2C") and mobile industry processor interface ("MIPI") circuit design protocols, as will be discussed in further detail herein. However, it will be appreciated that any other suitable protocol can be employed in connection with the present invention without departing from the scope of the present invention.

In the context of the present invention, it is contemplated that a "buffer" and "storage" is contemplated to include any suitable method and hardware for storing digital data in a retrievable and rewritable manner, as required. In some embodiments it is contemplated that a suitable buffer and suitable storage is located locally and directly hardwired to the constituent components of the present invention, while in other arrangements it is contemplated that the buffer can be located remotely and accessed wirelessly over a suitable electronic communication network. It is contemplated that a suitable buffer and suitable storage are in electronic communication with the image processing unit and at least one camera, as will be discussed in further detail herein.

In the context of the present invention, it is contemplated that a "frame", "image", "digital image", and "video" is contemplated to include any suitable electronic format for encoding visual data that is captured by a suitable camera sensor and transmitted to an image processing unit for storage and processing as required.

In the context of the present invention, it is contemplated that a "processing unit" is contemplated to include at least one image processing unit, at least one MIPI camera port, multitude of GPIO (general purpose input/output) lines that can be configured for any required purposes including triggering control signal, image capturing control signal, etc. and at least one set of I2C lines. In at least one embodiment, it is contemplated that a suitable processing unit can be, for example, a suitably configured Qualcomm 410 processor.

In the context of the present invention, it is contemplated that a "camera" or a "digital camera" is contemplated to include any number of suitable digital camera units including, but not limited to, monochrome and colour cameras, among any other suitable digital imaging units that will be readily appreciated by the skilled person. It will be also appreciated that in at least one embodiment a suitable camera will have a triggering mode (or in other words, will be adapted to capture a single digital image upon receipt of a trigger signal), while in other embodiments a suitable camera will have a video mode (or in other words, adapted to capture a series of digital frames as a continuous moving image), as discussed in further detail herein.

In the context of the present invention, it is contemplated that a "multiplexer" is contemplated to include any suitable multiplexing unit that will be readily understood by the skilled person.

In the context of the present invention, it is contemplated that a "line" or a "link" is contemplated to include any suitable electrical connection adapted for conveying a suitable electronic "pulse" or "signal", either digital or analog, at any suitable current, frequency and voltage. It is further contemplated that a suitable "line" or "link" can be comprised of multiple electrical connections or a single electrical connection, as is required by the specific end-user application of the present invention.

In the context of the present invention, it is contemplated that a suitable "switch" can include either an analog or digital switch and is further contemplated to include any suitable integrated circuit switching device such as, but not limited to, a high speed MIN switch such as a Fairchild Semiconductors™ FSA642UMX low power, three port, hi-speed differential switch and an 8-Channel I2C Switch such as a Texas Instruments® TCA9548A low-voltage 8-channel I2C switch, although other suitable components can also be employed as will be readily understood by the skilled person.

In the context of the present invention, it is contemplated that a "shift register" is contemplated to include any suitable integrated circuit shift register device such as an NXP Semiconductors™ 74LV595 serial-in, parallel-out shift/storage register, although other suitable components can also be employed as will be readily understood by the skilled person.

Circuit Hardware

It is contemplated that the present invention can provide methods and systems adapted to minimize the delay that is incurred between the trigger signals of multiple digital cameras such that a near identical image can be captured by each camera.

More specifically, the present invention contemplates systems and methods for the near-simultaneous triggering of multiple digital cameras on a single port of an image processing unit. As will be appreciated by the skilled person, this arrangement requires that the image data relating to these multiple images be routed back to the single image processing unit in a controlled manner. In at least one embodiment, it is contemplated that the multiple cameras are setup suitable in a multiplexed format using at least one general purpose input/output ("GPIO") line, as will be discussed in further detail herein.

With reference to FIG. 1A, it is contemplated that a suitable camera 10 for use in connection with the present invention can have a plurality of communication links, which can include but is not limited to:

- A camera control communication signal link 12 adapted for controlling and setting the camera by way of a camera control communication signal. In at least one embodiment, it is contemplated that this camera control communication signal link can be two synchronous I2C lines. In at least one embodiment, it is contemplated that the synchronous I2C lines include a data line ("SDL") and a clock line ("SCL");
- A data or image communication signal link 14 adapted for transmitting image data and receiving a data by way of a image communication signal. In at least one embodiment, this image communication signal link is at least one MIPI lane and at least one clock lane;
- A trigger communication signal link 16 adapted for triggering the digital camera by way of a trigger signal. In at least one embodiment, it is contemplated that the trigger communication link is a single trigger communication line;
- A reset communication signal link 18 adapted for initializing and turning on the digital camera by way of a reset signal. In at least one embodiment, it is contemplated that the reset communication signal link is a single reset communication line;
- An external clock communication signal link 20 adapted for synchronizing multiple digital cameras by way of an external clock signal. In at least one embodiment, it is contemplated that the external clock communication signal link is single external clock communication line. In the context of the present invention, it will be appreciated that an external clock communication signal link is optional when a camera is in triggering mode but it can be used for cameras in video mode, as will be discussed in further detail below; and
- A flash communication signal link 22 adapted for triggering a flash. In at least one embodiment, it is contemplated that the flash communication signal link is single flash communication line. In context of the present invention, it will be appreciated that a flash communication signal link is optional and will depend on the end user application of the present invention, as will be discussed in further detail below.

Given the multiple communication signal links required by a single camera 10 discussed above, it will be appreciated that a challenge is presented when trying to transmit multiple images from multiple cameras in a near-simultaneous manner to a single image processing unit.

Figure 1B:
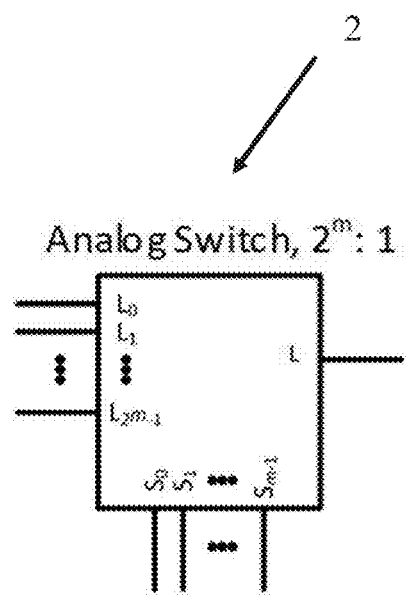
FIG. 1B is a diagram of one embodiment of a suitable analog low frequency switch (suitable, for example, for controlling an I2C and/or reset signal) in accordance with at least one embodiment of the present invention.
Figure 1C:
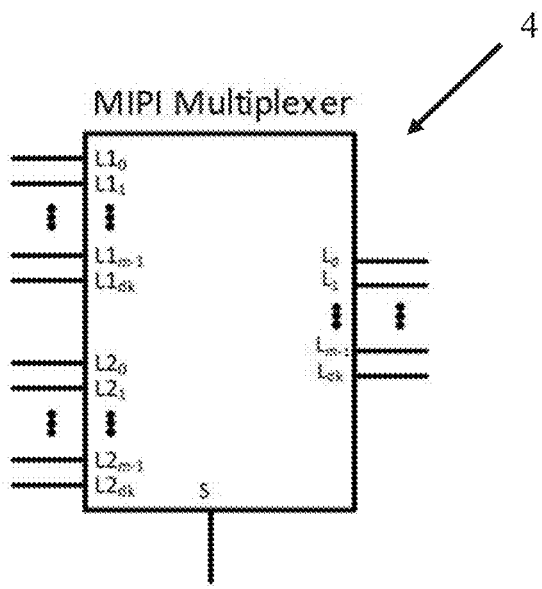
FIG. 1C is a diagram of one embodiment of a suitable 2×1 multilane high frequency multiplexer (suitable, for example, for controlling MIPI links) in accordance with at least one embodiment of the present invention.
Figure 1D:
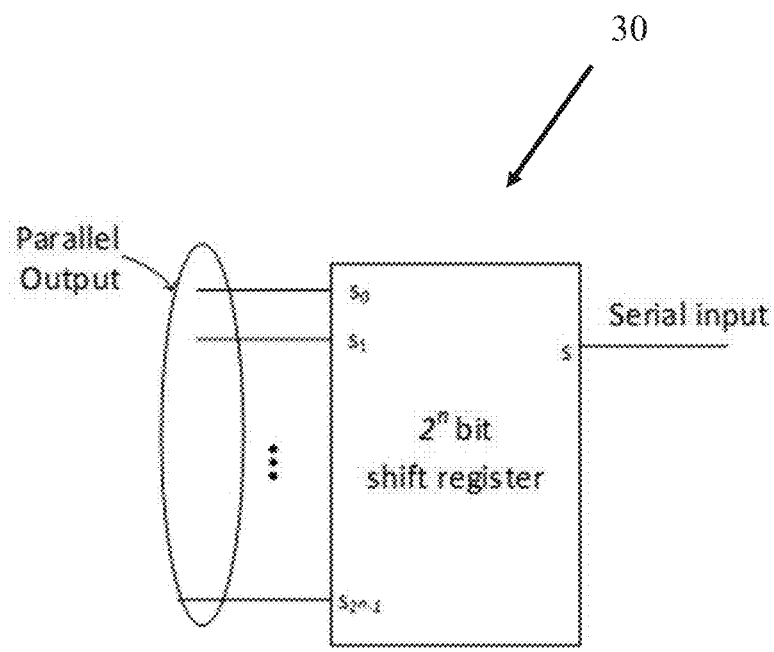
FIG. 1D is a diagram of one embodiment of a suitable shift register used for signal generation and control in accordance with at least one embodiment of the present invitation.

FIGS. 1B, 1C and 1D shows building blocks that can be used to connect a single processing unit to multiple cameras. It will be appreciated that the proper operation of the entire system will depend at least in part on proper software development after selecting a suitable camera operation mode as discussed herein.

More specifically, FIG. 1B illustrates a suitable $2^m:1$ analog switch 2, FIG. 1C illustrates a suitable 2×1 multilane high frequency multiplexer 4 and FIG. 1D illustrates a suitable $2^n$ bit shift register 30 that can be used to connect the individual cameras to a processing unit in accordance with the present invention.

Figure 2:
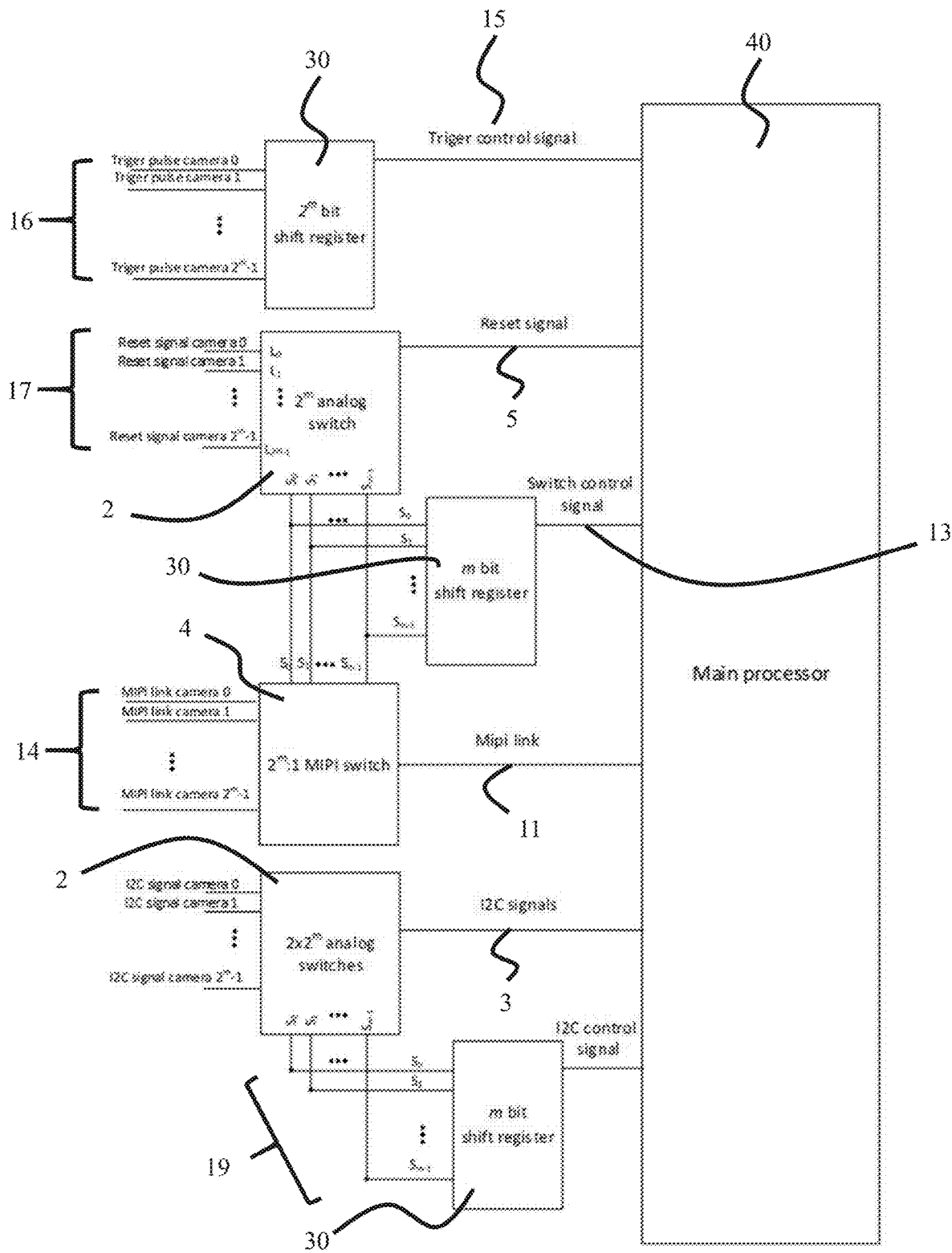
FIG. 2 is a diagram of a general circuit arrangement for use in accordance with at least one embodiment of the present invention.

With reference to FIGS. 1B and 2, it is contemplated that in at least one embodiment two of $2^m:1$ analog switches 2 can be used to multiplex the I2C links 12 required by each of cameras 10 employed in the present invention, although other arrangements are also contemplated. In at least one embodiment, it is also contemplated that a dedicated $2^m:1$ analog switch 2 can be used for multiplexing a series of reset signals 18 for each of cameras 10 that are employed by the present invention.

Figure 3A:
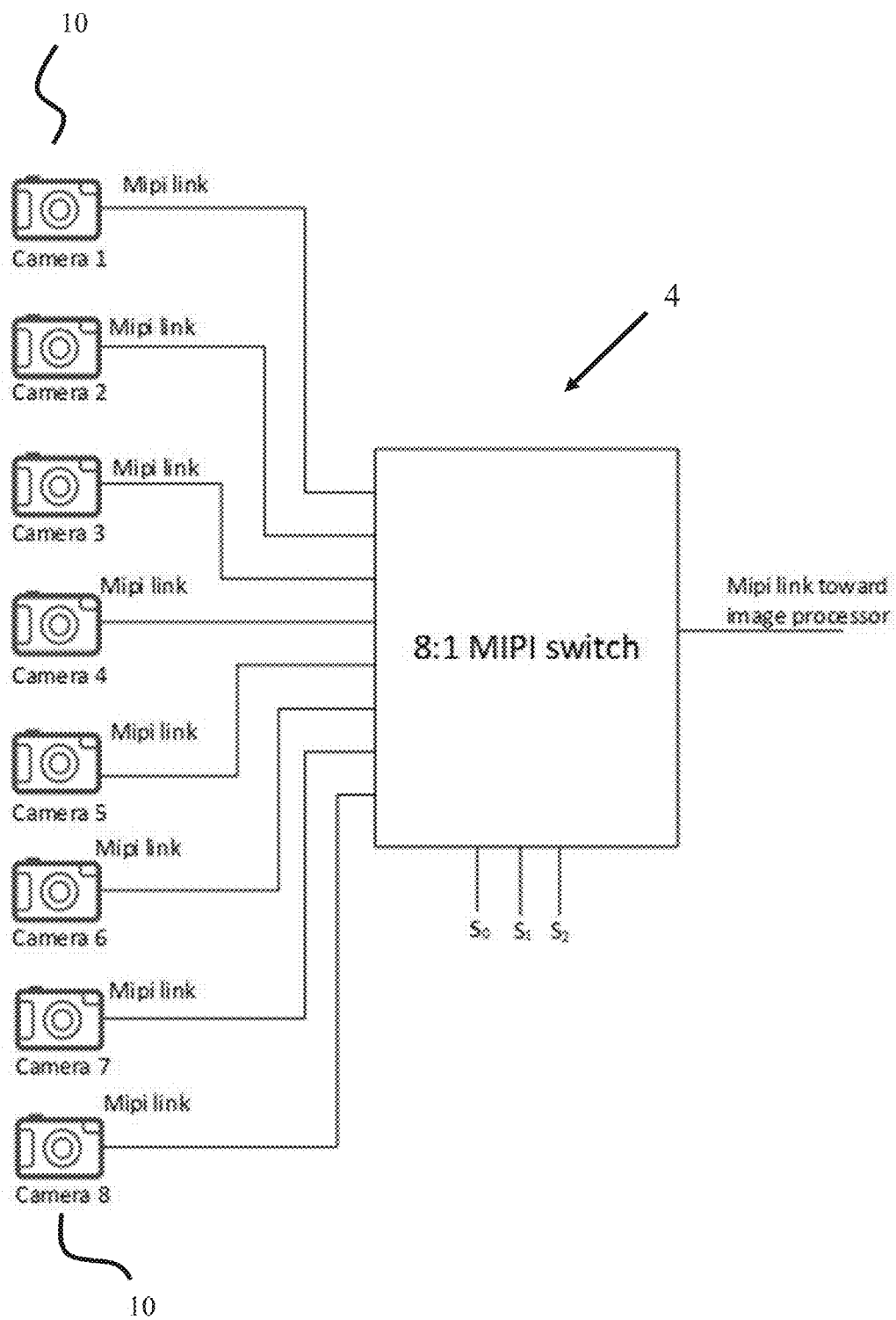
FIG. 3A is a diagram of one embodiment of $2^n$:1 MIPI link multiplexing arrangement (n=3) for use with a suitable system in accordance with at least one embodiment of the present invention.
Figure 3B:
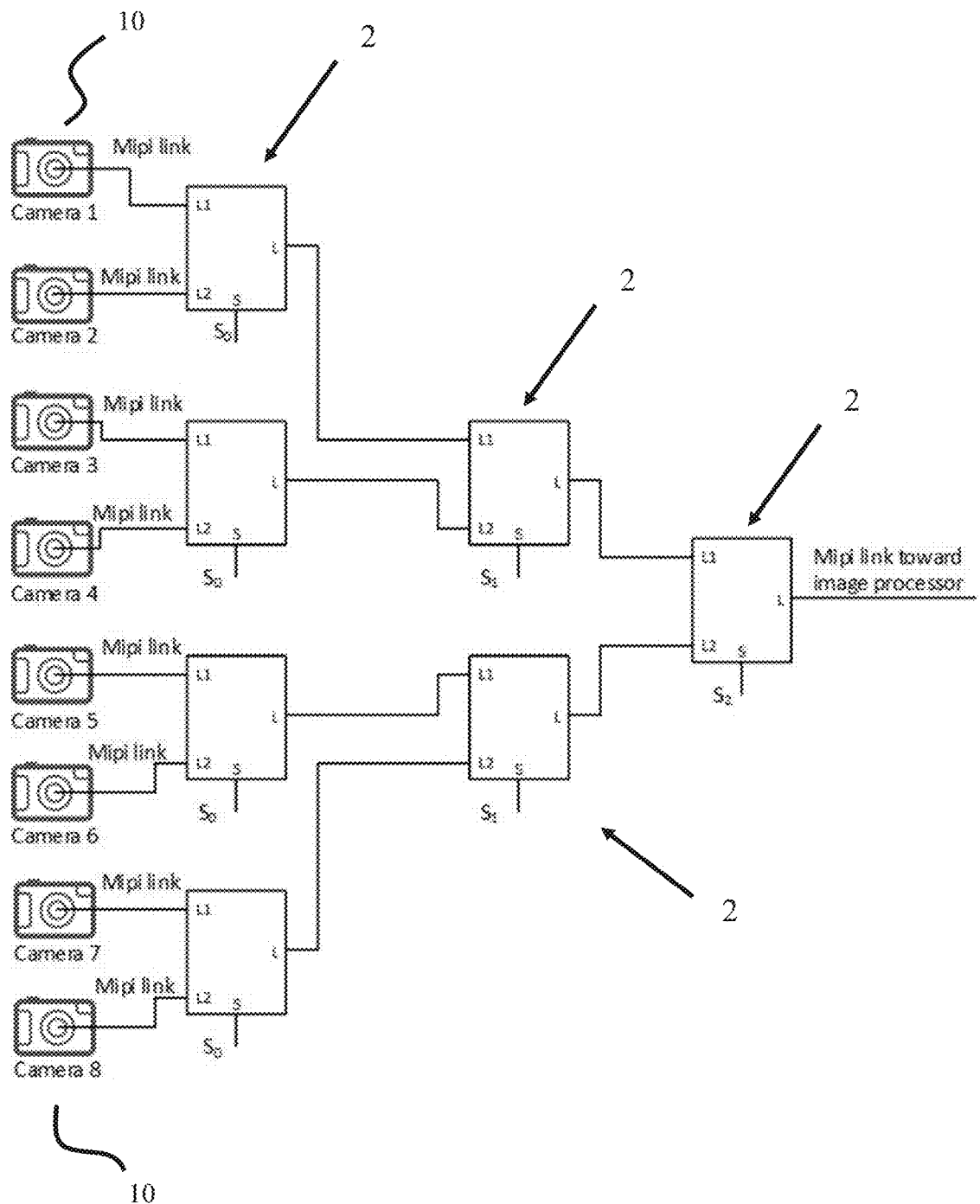
FIG. 3B is the diagram of one embodiment of $2^n$:1 MIPI link multiplexing arrangement (n=3) using tree-mux architecture with 2:1 MIPI switch in a cascaded format for use in accordance with at least one embodiment of the present invention.

With reference to FIGS. 1C and 2, in the context of the present invention, it is contemplated that a MIPI multiplexer unit 4 can be used in at least one embodiment to multiplex the MIPI links required by each of cameras 10 employed in the present invention, although other arrangements are also contemplated. In at least one embodiment, it is contemplated that a dedicated MIPI multiplexer 4 is dedicated to two cameras, and that this MIPI multiplexer can be arranged in a tree architecture when more than two cameras are employed by the present invention, as can be seen in FIGS. 3A and 3B and as will be readily appreciated by the skilled person.

With reference to FIGS. 1D and 2, it is contemplated that in at least one embodiment a shift register 30 can be used to convert a single link from processing unit 40 to a m links for each camera 10 employed in the present invention, although other arrangements are also contemplated. In at least one embodiment, it is also contemplated that shift register 30 can be used for converting individual trigger control signals, switch control signals, and I2C control signals to m individual trigger signals, m switching signal for Reset signal and MIPI links, and m switching signals for I2C signals, as can be seen in FIG. 2.

In at least one embodiment, it is contemplated that the individual analog switches 2 and MIPI multiplexing units 4 and shift register 30 discussed herein can be controlled alternately by using as many general purpose input/output ("GPIO") lines as required by the end-user application.

In at least one embodiment and as can be seen in FIG. 2, it is contemplated that the timing of the individual trigger signals 16 and the coordination of the image communication control signals can be achieved by using shift registers 30 suitably connected to processing unit 40.

In at least one embodiment, it is contemplated that a trigger control signal 15 can be sent from processing unit 40 to shift register 30 and in turn the parallel individual trigger signals 16 can be generated at fixed intervals by shift register 30 while a second shift register 30 can be used to generate a suitable switching signal for MIPI switches 4. In some embodiments it is contemplated that a third shift register 30 can be used to generate switching signals 19 for I2C switches 2.

In this way, it is contemplated that upon issuing the main trigger signal a resulting trigger control signal 15 can be sent from processing unit 40 to the shift register 30 to generate individual trigger signals 16 for each of the individual digital cameras 10. In at least one embodiment, it is contemplated that the trigger control signal 15 and the individual trigger signals 16 are digital pulses.

Moreover, it is additionally contemplated that switch 2, such as but not limited to an n-channel inter-integrated circuit ("I2C") switch, together with switching signals 19 can be used to switch I2C lines 3 between the individual cameras.

Moreover, it is contemplated that a number of cameras 10 can be connected to a single MIPI camera port of processing unit 40, as will be discussed in further detail herein.

Multiplexing Schemes

As will be readily appreciated by the skilled person and with reference to FIGS. 1A, 1B, 1C, 1D, 2, 3A and 3B, a number of arrangements have been developed to address the challenge of connecting a plurality of cameras 10 to a single processing unit 40.

With reference to FIGS. 3A and 3B, a known MIPI multiplexing scheme (FIG. 3A) and a tree-mux configuration (FIG. 3B) can be used to connect MIPI links 14 of cameras 10 to processing unit 40 in accordance with the present invention, as will be readily appreciated by the skilled person.

As will be appreciated by the skilled person, in at least one embodiment a suitable processing unit 40 for use in connection with the present invention typically has at least one I2C communication port for connecting I2C links 3 and at least one MIPI port for connecting MIPI links 11. As discussed herein, in some embodiments it is contemplated that an I2C communication link can include a data line (SDL) and a clock line (SCL) and a MIPI communication link can include at least one MIPI line and a clock line, however other arrangements are also contemplated.

As discussed herein and as can be seen in FIG. 1A, in some embodiments it is contemplated that a suitable camera 10 can provide at least an I2C input/output link (in the form of, for example, a camera control communication signal link 12), a MIPI output communication signal link (in the form of, an image communication signal link 14), a triggering communication signal link 16, a reset communication signal link 18 and an external clock communication signal link 20 for embodiments where the camera operates in video mode. As such, it is contemplated that the present invention will need to provide multiplexing for multiple I2C links, multiple MIPI links, multiple triggering signals and multiple reset signals, as will be appreciated by the skilled person.

As will be appreciated by the skilled person and with reference to FIGS. 1A, 1B, 1C, 1D, 2, 3A and 3B, these tasks are achieved in order to minimize the overall disturbance to the operation of processing unit 40, however other arrangements are also contemplated as will be appreciated by the skilled person.

Triggering the Cameras

With reference to FIG. 2, upon issuing the main trigger signal either from UAV navigation block (not shown) or by processing unit 40, triggering control signal 15 can be generated by processing unit 40. Triggering control signal 15 passing through shift register 30 generates multiple individual signals 16 for triggering each camera 10 as will be readily understood by the skilled person.

Resetting the Cameras

With reference to FIG. 2, it will be appreciated that a reset signal 5 must be generated to reset the multiple digital cameras 10. It is contemplated that reset signal 5 can be generated by processing unit 40, as will be readily understood by the skilled person. Moreover, it will be further appreciated that reset signal 5 must be generated subsequently and converted to multiple individual reset signals 17 for resetting each camera 10. In at least one embodiment, it is contemplated that reset signal 5 is converted to multiple individual reset signals 17 by way of a switch 2 and switching the signal coming from shift register 30.

Controlling the Multiplexed MIPI Cameras

With reference to FIG. 2, in at least one embodiment it is contemplated that a second shift register 30 can be used to control the operation of the multiplexed image communication signal links 14, each of which are linked to a respective camera 10, by way of a main image communication signal link 11 in communication with a suitable port of processing unit 40.

In this way, it is contemplated that shift register 30 can be used to generate a switching signal for each of the MIPI switches 4 to control the flow of data to processing unit 40 through the main image communication signal link 11 and each camera 10 that is employed by the present invention. In this way, multiple image communication signal links 14 can be multiplexed into a main image communication signal link 11 for input into a suitable port of processing unit 40.

Control Signal Switching of the Cameras

With reference to FIG. 2, in at least one embodiment it is contemplated that a suitable processing unit 40 typically has a single input/output link 3 for accommodating a control signal for camera 10 (which, in at least one embodiment, can be a synchronous I2C line set 12).

As such, it is contemplated that in order to adapt processing unit 40 for use in connection with a plurality of cameras 10, each of the plurality of cameras 10 will need to be switched to the input/output channel of processing unit 40 in turn in order to facilitate the transfer of data between processing unit 40 and each of cameras 10.

With reference to FIG. 2, whenever communication with an individual camera 10 is desired, I2C control signal 25 can be generated by processing unit 40. I2C control signal 25 passing through shift register 30 generates a proper switching signal 19 for controlling switch 2. After proper switching, a direct connection will be provided between the I2C synchronous link 3 of processing unit 40 and one of I2C signals of individual cameras 26, as will be readily understood by the skilled person.

In at least one embodiment, it is contemplated that two of switches 2, such as I2C switches, can be used to switch the control signal of multiple cameras 10. It will be appreciated that a suitable switch for n cameras can provide n double channels to switch between (i.e.: one for SDL and another for SCL). In other words, it is contemplated that the suitable switch 2 will provide n:1 switching between the plurality of cameras 10 and the single input/output link of processing unit 40.

In this way, it is contemplated that multiple cameras 10 can be connected to a single input/output link 3 of processing unit 40 so that communication between each camera 10 and processing unit 40 can be switched as necessary, as will be discussed in further detail herein.

Near-Simultaneous Triggering of Multiple Cameras

In at least one embodiment, it is contemplated that during in-flight mode a main trigger pulse can be generated either by the processing unit 40 or the flight navigation unit of the UAV to initiate the capture of the images, as is discussed in further detail herein.

In some embodiments, it is contemplated that multiple cameras mounted on a UAV are triggered in a near-simultaneous manner in order to capture near-simultaneous images of a single object. In these embodiments, it will be appreciated that the object of interest may be moving with respect to camera module, as the UAV itself may be moving. As discussed herein, in multiple camera applications it is contemplated that the UAV can include n cameras. In some embodiments, each of the n cameras has a respective optical filter for capturing the reflected light from the object of interest at predetermined, distinct wavelengths.

In at least one embodiment, a main trigger pulse period (47) between successive triggering pulses can be calculated dynamically as follows:

$$\Delta T = \frac{2h \tan(VFOV/2)}{v} \times (1 - \text{Overlap})$$

Where h and v are the UAV height and speed respectively, and VFOV is the camera field of view in the direction of flight and "Overlap" is the desired overlap between successive images. In this embodiment, it is contemplated that the navigation system can generate the trigger signals to maintain the desired overlap between images. It will be appreciated that it is desirable to ensure that images are taken with minimum latency with respect to each other and to be stored before a subsequent triggering signal is generated.

Triggering Mode

Figure 4:
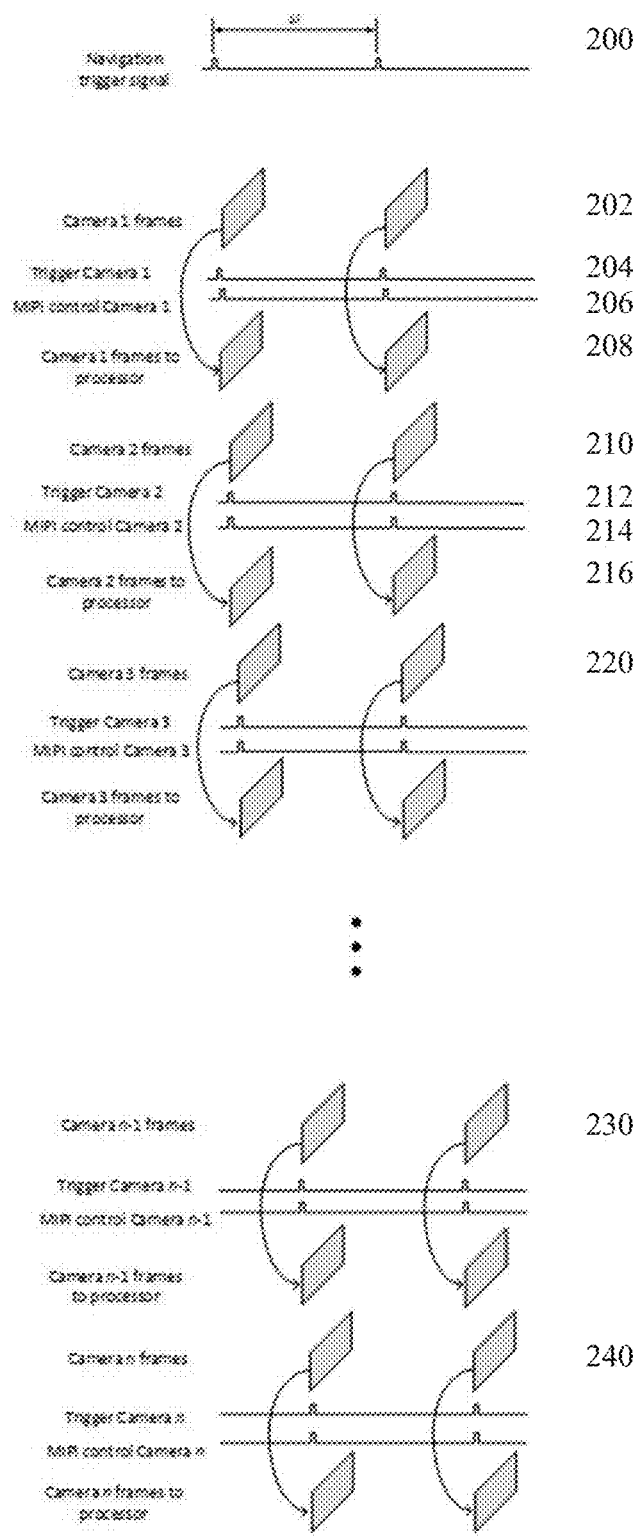
FIG. 4 is an illustration of one embodiment of the triggering and image acquisition process timing for cameras in triggering mode in accordance with at least one embodiment of the present invention.
Figure 5A:
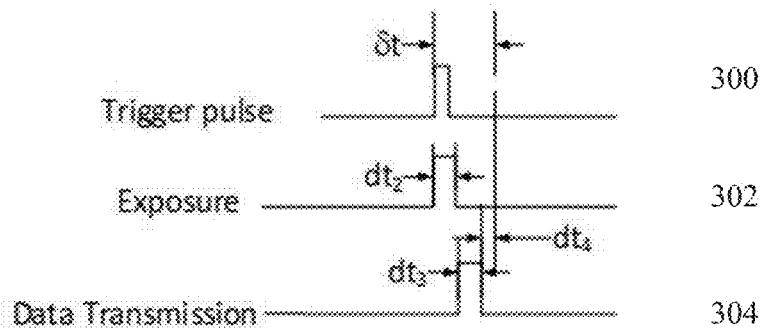
FIG. 5A is an illustration of one embodiment of the trigger timing process in accordance with the embodiment of FIG. 4.
Figure 5B:
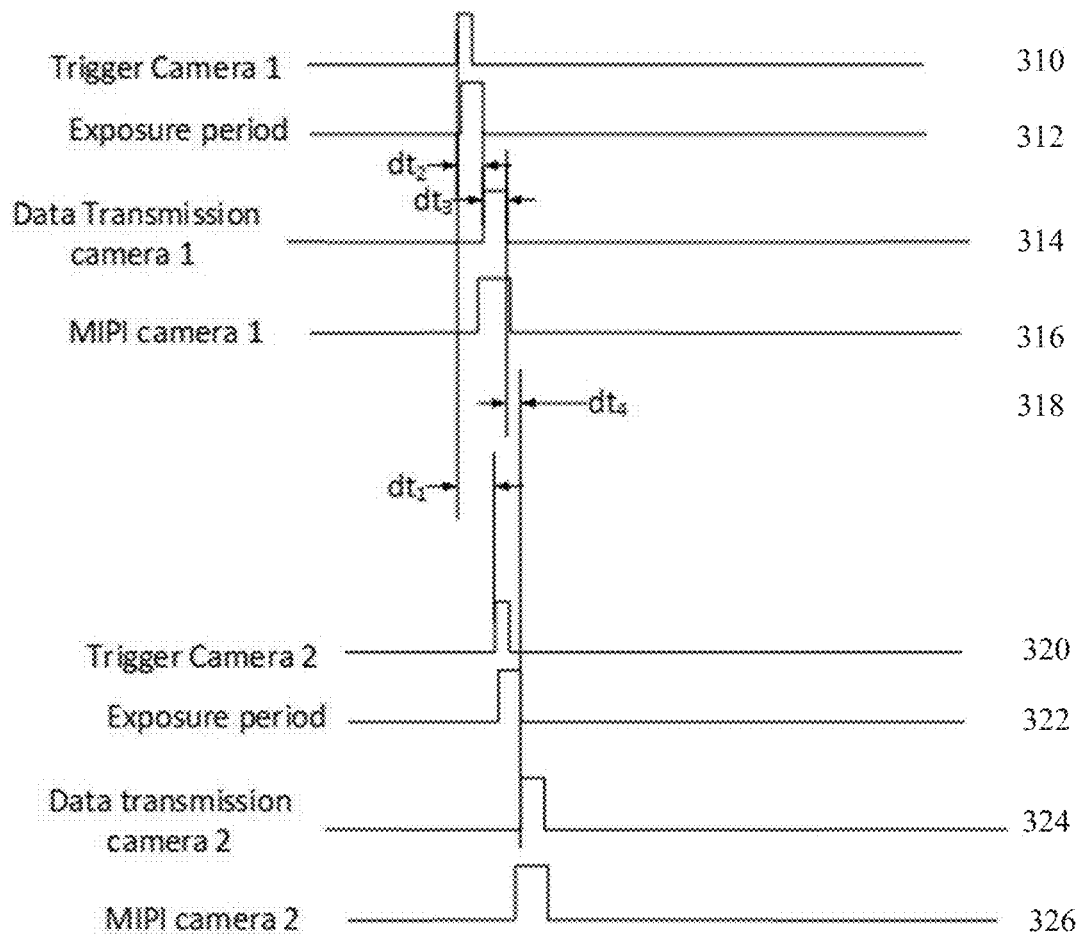
FIG. 5B is an illustration of one embodiment of the image acquisition timing process in accordance with the embodiment of FIG. 4.

In the context of the present invention, in at least one embodiment it is contemplated that at least one camera in a triggering (or "trigger") mode can generate a single frame upon receiving a triggering signal from the processing unit, as can be seen in FIGS. 4, 5A and 5B.

With reference to FIG. 4, one embodiment of a method for triggering the timing of multiple cameras in triggering mode is illustrated. In this embodiment, it is contemplated that a first trigger signal and a second trigger signal are separated by a main trigger pulse period ($\Delta T$) 200 that represents the time between the triggering of subsequent images from the same camera 202. As a first camera is triggered 204, the MIPI image communication signal link of that camera is subsequently activated 206 and a frame is obtained and sent to the processing unit 208.

This process can then be repeated for a second camera 210 which is triggered 212, the MIPI image communication signal link of that second camera can be subsequently activated 214 and a second frame is obtained and sent to the processing unit 216.

This process can be repeated for a third camera 220, and so forth to camera n−1 230 and camera n 240.

After the main trigger pulse period ($\Delta T$) passes, and after issuing the second main triggering signal, a second trigger pulse for the first camera, second camera, third camera, and so forth to camera n−1 and camera n occurs and the process can begin anew and a subsequent image can be taken by each of these cameras. As a result, n near-simultaneous images are obtained by n separate cameras in response to each main trigger pulse in a resource efficient manner.

Turning to FIG. 5A, at least one embodiment of the specific timing details is illustrated. In this embodiment, it is contemplated that a frame period (δt) 300 is the minimum time between two consecutive trigger pulses for a single camera. In the context of the present invention, it is contemplated that this frame period (δt) 300 is comprised of the sum of the camera exposure time ($dt_2$) 302, a data transmission time associated with the camera ($dt_3$) 304, and the margin for the camera to be ready for capturing a subsequent image ($dt_4$).

In other words, it is contemplated that the period of time between when a camera is initially triggered and when that camera can be successfully subsequently triggered includes the exposure time (also known as the "integration time"), the time to electronically transmit the acquired image to a buffer and the time required in order to provide a margin for the camera to be ready for the next trigger pulse.

As can be seen in FIG. 5B, an initial trigger signal is generated for a first camera 310. This is followed by a predetermined exposure period ($dt_2$) for the first camera where the image is obtained 312. After an image is obtained by the first camera, the image can then be transmitted from the first camera to a buffer over a data transmission period ($dt_3$) by way of an image communication link 314 between the first camera and the processing unit. In at least one embodiment, it is contemplated that the image communication link is a MIPI link as discussed herein.

It will be appreciated that before the data transmission from the first camera 314 can begin, it is contemplated that the image communication link must be established 316 between the camera and the processing unit 40. It will further be appreciated that this image communication link must be established 316 until the data transmission period ($dt_3$) is terminated 314 in order to result in the successful transmission of the image data from the first camera to the buffer.

Once data transmission ends, it is contemplated that there is an additional time delay ($dt_4$) 318 before the processing unit is ready again to receive and store a subsequent image from a subsequent camera. However, once an initial triggering signal for a first camera is generated it is further contemplated that additional individual triggering signals can be generated 312 for each of the subsequent cameras before the first image is captured and transferred to the buffer.

Furthermore, it is contemplated that individual image communication links also need to be established for each of the subsequent cameras. In at least one embodiment and as can be seen in FIG. 3, it is contemplated that these image communication links are configured by control switches used in a tree multiplexing configuration, as discussed previously herein.

In at least one embodiment, it is contemplated that a first image communication link 316 is established just before the exposure period ($dt_2$) ends 312 and the data transmission period ($dt_3$) 314 begins. However, it is further contemplated that the subsequent second image communication link 326 can be established by the provided multiplexed switching arrangement as soon as possible after the first image communication link is terminated.

In the period following the establishment of the first image communication link 316 and the establishment of the second image communication link 326, it is contemplated the second camera can be triggered 320 and the exposure period for the second camera can be initiated in the interest of obtaining a second image 322. In at least one embodiment, it is contemplated that the exposure period for the second camera does not end until after the second image communication link has been established 326.

In this way, it is contemplated that up on receiving the appropriate individual triggering signal, each of the n cameras can subsequently start integrating the incoming light intensity at a specific wavelength for a predetermined exposure period ($dt_2$) 312, 322. The obtained image is subsequently digitized by the camera sensor and passed over an image communication link (such as a MIPI link) to a buffer in electronic communication with the processing unit. In this way, it is contemplated that a corresponding image communication link governs the transmission of an image from a camera to the processing unit.

In some embodiments and as discussed herein, it is contemplated that the image communication link is a MIPI communication link that is established for a data transmission time ($dt_3$) which includes a short period before the image data transmission actually begins in order to provide a margin of error to ensure the processing unit has received and stored the digital image data in the buffer. In some embodiments, it is further contemplated there is an additional time delay ($dt_4$) before the image processor unit is ready again to receive and store the next coming frame.

As a result and with reference to FIGS. 5A and 5B, in this way it is contemplated that the overall frame latency ($dt_1$), or in other words the time that elapses between when a first camera is triggered and a subsequent camera is triggered, is independent of the required camera exposure time and is only function of the data transmission time ($dt_3$) and the delay time ($dt_4$) as follows:

$$dt_1 = dt_3 + dt_4$$

In this way, it is contemplated that the present invention can provide methods and systems for the near-simultaneous triggering of a first camera and a subsequent camera in order to capture near-simultaneous images of a single object when these cameras are in a triggering mode.

More specifically, it is contemplated that at least a first trigger signal associated with a first camera and a subsequent trigger signal associated with a subsequent camera are overlapped with a first image communication link that is associated with that first camera and a second image communication link associated with the second camera, such that following the initiation of a first trigger signal, a first image communication link, a first exposure period and a first data transmission link, all associated with the first camera, a subsequent trigger signal and subsequent exposure period is initiated prior to the termination of the first communication link and first data transmission link.

In this way, a subsequent camera can be triggered and exposed at the same time that a first camera is transmitting image data to a buffer of a processing unit. As a result, a first image can be obtained and transmitted to a processing unit by a first camera and a subsequent second image can be obtained and transmitted to the same processing unit by a second camera in a nearly simultaneous manner.

Video Mode

Figure 6:
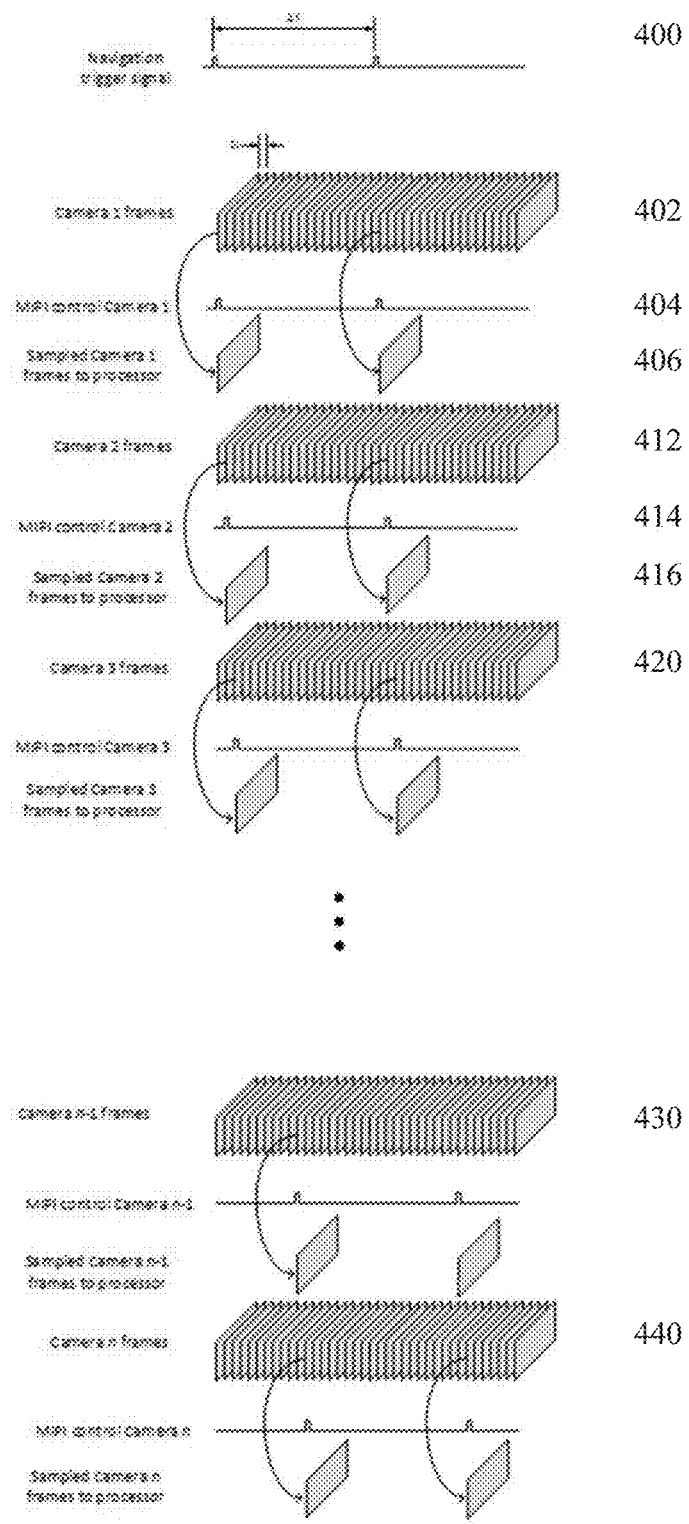
FIG. 6 is an illustration of an embodiment of an image acquisition process timing for cameras in video mode in accordance with at least one embodiment of the present invention.
Figure 7A:
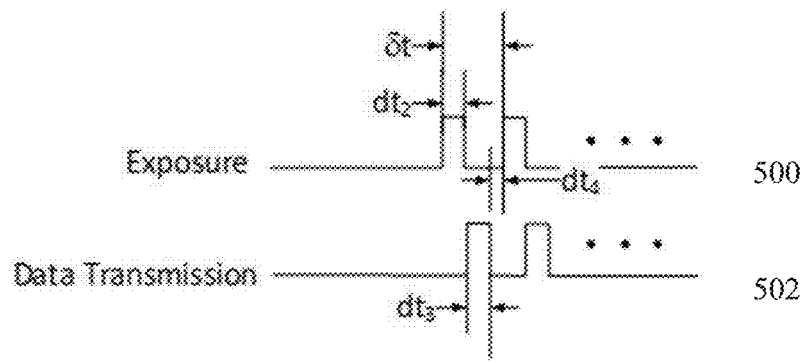
FIG. 7A is an illustration of an embodiment of the details of exposure and data transmission timing in accordance with the embodiment of FIG. 6.
Figure 7B:
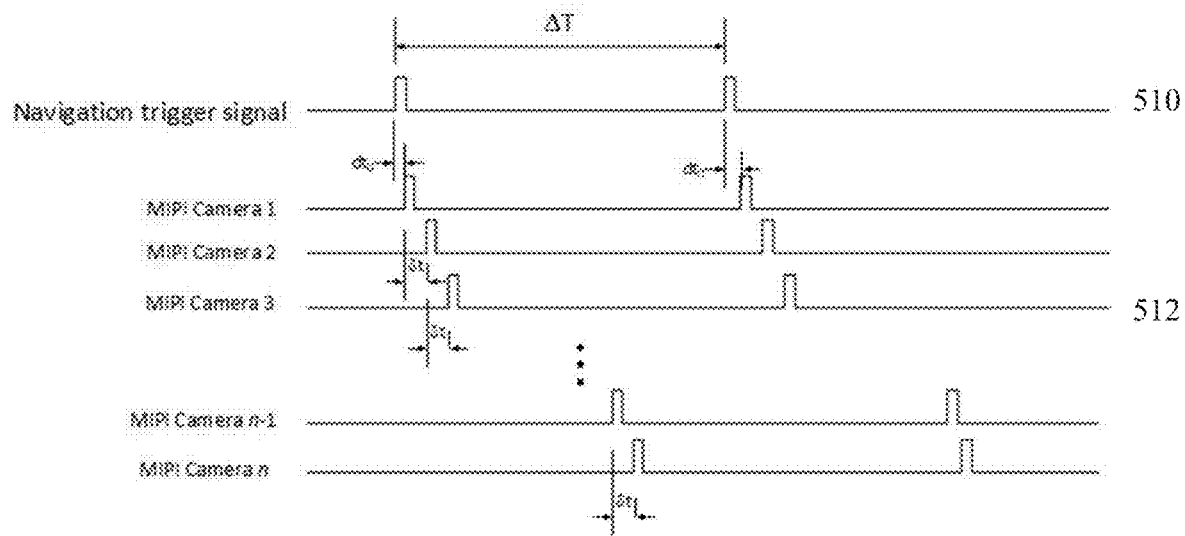
FIG. 7B is an illustration of an embodiment of the image acquisition switch control timing process in accordance with the embodiment of FIG. 6.

In the context of the present invention, in another embodiment it is contemplated that all cameras are in video mode such that they can generate digital video upon receiving a trigger signal from the processing unit, as can be seen in FIGS. 6, 7A and 7B.

In the context of the present invention, it is contemplated that a suitable video is comprised of a plurality of separate digital image frames that form a moving video image when sequentially arranged, as will be readily understood by the skilled person. In video mode, it will be appreciated that each of the individual cameras generate periodic image frames at a predefined frame per second ("FPS") rate. In some embodiments, the FPS rate can range from 30 to 50 frames per second, although other arrangements are also contemplated.

In the context of the present invention, all cameras in video mode should be synchronized by using a common external clock such that that the frames from all cameras are taken at the same time provided that they start at the same time. This ensures that image frames from all cameras are aligned properly in time domain.

In this embodiment, it is contemplated that a main triggering signal triggers the frame sampling procedure. In this way the cameras are running and obtaining sequential image frames at all the times but only the sampled frames will be saved in the processor's buffer. The images in the buffer will finally be transferred to the memory.

With reference to FIG. 6, one embodiment of a method for timing multiple cameras in video mode is illustrated. It is contemplated that if the image communication link periods for each of the cameras are adjusted properly, then it is possible to sample a first frame from a first set of frames obtained by a first camera and sample a second frame from a second set of frames obtained by a second camera. In this way, it is contemplated that the first frame and the corresponding second frame represent two near identical images captured by two separate cameras.

Next, it is contemplated that an image communication link (which can be a MIPI link) must be established between the first camera and the processing unit by generating proper MIPI switching signal using through a shift register for operation of MIPI switches, as also illustrated in FIG. 3. This enables the transmission of a sampled first frame 406 from the first camera to the processing unit.

Next, it is contemplated that a second image communication link must subsequently be established between the second camera and the processing unit 414 to enable the sampling and transmission of second frame 406 from the second camera to the processing unit.

It is contemplated that this process can be repeated for a third camera 420, and so forth for a camera n−1 430 and a camera n 440. In this way it is contemplated that a first frame, a second frame, a third frame, and so forth an n−1 frame and an n frame can be sampled from video frames of n cameras in a subsequent manner in order to obtain n nearly simultaneous frames.

After the main trigger pulse ΔT, a second communication link for the first camera, second camera, third camera, and so forth for camera n−1 and camera n will be established and the process can save the sampled frames from the series of frames obtained by each of these cameras. In this way, n nearly simultaneous frames are sampled from n cameras in video mode in response to the start signal.

FIGS. 7A and 7B illustrate the timing of establishing the respective image communication links for each of the cameras in video mode. More specifically, it is contemplated that a suitable frame period (δt) can be determined as the sum of the exposure time of a camera ($dt_2$), the transmission period of a camera ($dt_3$) and a margin for the camera to be ready for the next frame ($dt_4$) 500 as follows:

$$\delta t = dt_2 + dt_3 + dt_4$$

Turning to FIG. 7B, it is contemplated that once the processor has received the main trigger signal 510 it has to subsequently generate proper control signals to control the image communication links for each of the cameras. It is contemplated that these control signals effectively connect a specific camera to the processor for specific amount of time 512, as can be seen in FIG. 7B. Given that in this embodiment the start signal is not aligned with the camera frames, it is contemplated that the actual trigger signal can be delayed by maximum of frame period (δt), which can be calculated as follows:

$$\delta t = 1/FPS$$

In this way, it is contemplated that the present invention can provide methods and systems for the orderly sampling of image frames from synchronous cameras in video mode. More specifically, it is contemplated that a first frame can be sampled from a first set of frames obtained by a first camera and a second frame can be sampled from a second set of frames obtained by a second camera such that the first frame and the second frame represent two near identical images captured by two separate cameras in video mode.

General Software Operation

As will be readily appreciated by the skilled person, it is contemplated that the present invention includes integrated hardware and software aspects. In at least one embodiment, the camera module software operation can be divided into three general modes of operation: a booting mode; pre-flight mode; and an in-flight mode. Proper consideration for each mode of operation has to be taken into account in order to have the camera module working properly.

Although the following description identifies suitable software operations in connection with cameras that are in a trigger mode, it will be readily understood that these software operations can also analogously be applied to cameras in video mode.

Booting Mode

In at least one embodiment and with reference to FIG. 8A, it is contemplated that during the booting mode, the processor can check for the presence of connected, predefined device in order to ensure the appropriate software drivers are ready for operation. In at least one embodiment, it is contemplated that the predetermined device is at least one camera, as discussed herein.

More specifically, in some embodiments it is contemplated that the software initially checks for the presence of a camera 100. If the camera is detected, it is contemplated that the software can be adapted to subsequently reset the camera and send some test data between the camera and the processing unit by way of a pre-registered I2C address 102. Once the camera is reset 102, it is contemplated that the software can be adapted to wait for an acknowledgement from the camera for a predetermined amount of time 104.

If an acknowledgement is not received 106, it is contemplated that the device will be ignored and software proceed to the next step. If the acknowledgement is received 108, it is contemplated that the device is kept in a ready mode 110.

In other embodiments and with reference to FIG. 8B, it is contemplated that the appropriate reset line and I2C line must be initially reset 101 so that a connected device, which has not been predefined as discussed above, can be validated 102 for use in connection with the present invention.

Pre-Flight Mode

Once the processor has successfully initialized at least one digital camera as seen in FIGS. 8A and 8B, it is contemplated that the software can proceed to a pre-flight mode.

In at least one embodiment and as can be seen in FIGS. 9, 10, 11 and 12, it is contemplated that the pre-flight mode can consist of the following steps of: initializing all digital cameras, adjusting the gain and exposure time of all cameras individually and saving the images of calibration panel if needed.

Initializing a Camera

Figure 9:
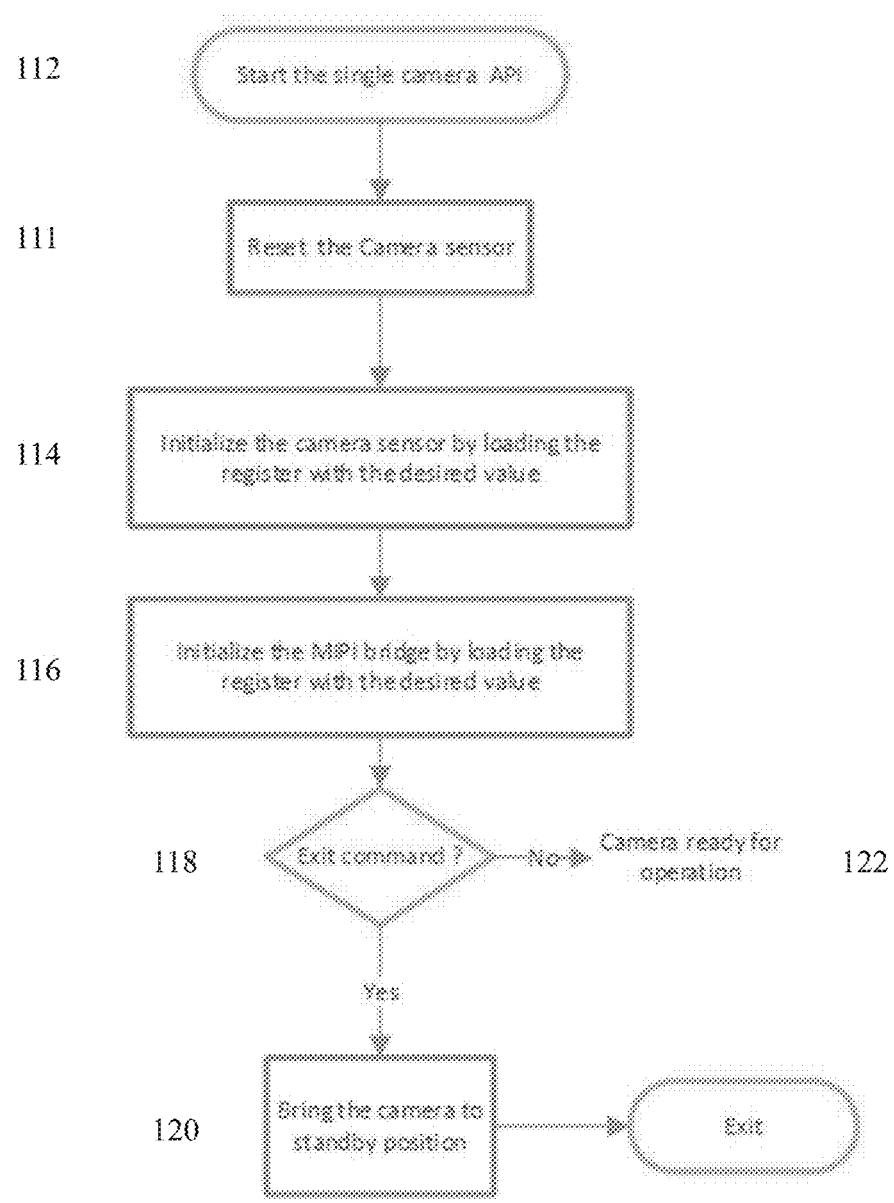
FIG. 9 is a flowchart of one embodiment of a procedure for initializing a single camera in accordance with at least one embodiment of the present invention.

With reference to FIG. 9 and with respect to initializing all cameras, it is contemplated that in at least one embodiment a camera application program interface ("API") can be provided for operating all the digital cameras 112. It is contemplated that the camera API can start by initializing a first camera 114. In at least one embodiment, this is achieved by loading the first camera register data through a corresponding first camera control communication link 114 that can be an I2C link. In some embodiments, it is contemplated that cameras must first be reset 111.

As will be appreciated by the skilled person, it is contemplated that each camera should be reset individually 111 in order to initialize each camera for capturing a new image. In at least one embodiment, this can be accomplished by sending a simple digital pulse from the processing unit to the camera being initialized. It is also contemplated that a pulse can be used to reset a camera, as will be appreciated by the skilled person.

Next, it is contemplated that the bridge parameters can be configured 116. It will be appreciated by the skilled person that a bridge usually exists to convert the parallel image data from the camera to an appropriate format that is suitable for transmission over an image communication link to the processing unit. In some embodiments, a suitable image communication link will be a MIPI link and the format is the MIPI format as discussed herein. It will be appreciated that, in some embodiments, the camera sensor and bridge each have distinct addresses which are different addresses.

It is contemplated that after a user follows initialization step and is ready to exit the process 118, the camera can be maintained in a standby position 120 by the API for an indeterminate period of time. On the other hand, should the camera need to be used immediately, the exit command can be rejected and following these preceding steps, the digital camera is ready for operation and placed in an active mode 122.

Initializing n Cameras

Figure 10:
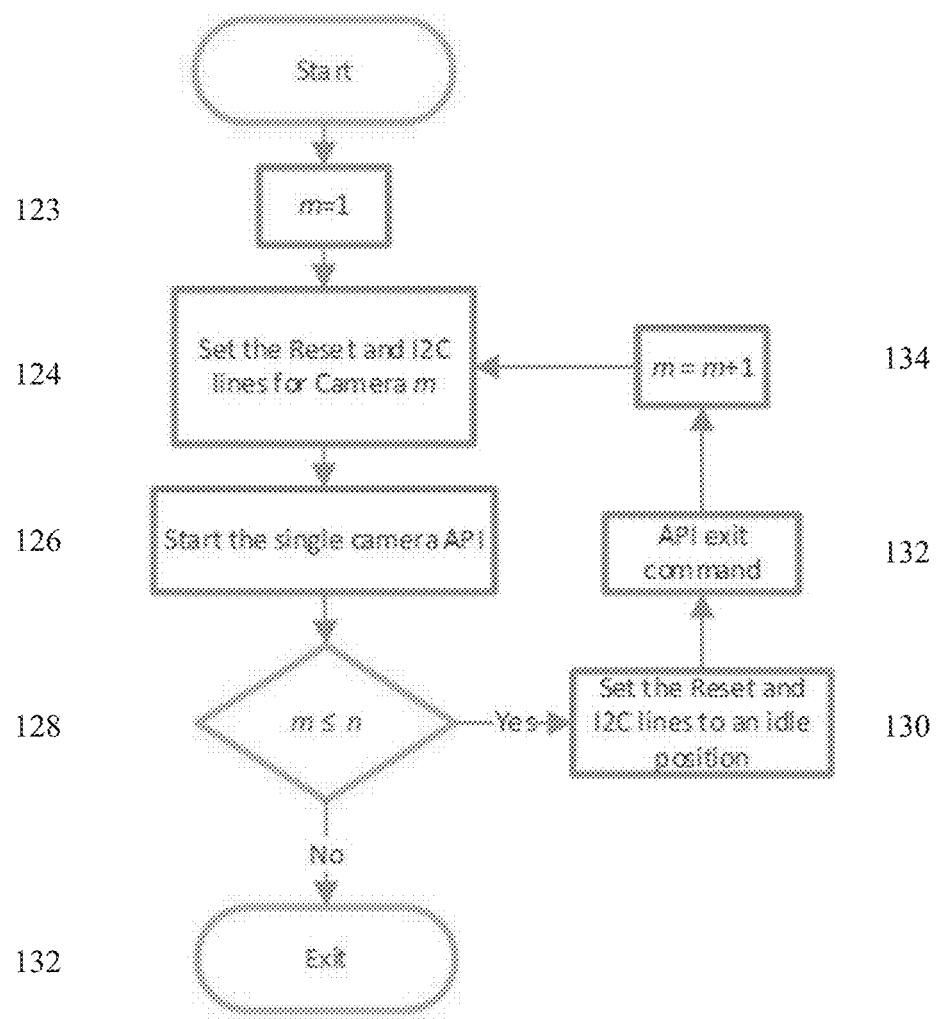
FIG. 10 is a flowchart of one embodiment of a procedure for initializing n cameras in accordance with at least one embodiment of the present invention.

In the embodiment with reference to FIG. 10, it is contemplated that n cameras will need to be initialized. It will be understood that for camera m to be initialized 123, the software can be adapted to set the I2C lines and the reset lines to camera m 124 through the camera API 126. However, in this embodiment, if the $n^{th}$ camera has not been reached 128, the I2C lines and the reset line can be set to an idle position 130 rather than exiting the API 132. Following this, the API can run again after setting the I2C lines and the reset lines to that of a subsequent camera (i.e. camera m+1) 134. It is contemplated that this process can repeat onwards until the $n^{th}$ camera is initialized. When the $n^{th}$ camera is reached 128, it is contemplated that the API can be exited 132.

Calibrating the Cameras

Once the cameras are reset and initialized, it is next contemplated that gain and exposure time of each camera can be calibrated individually if it is necessary by any number of known calibration processes. This can include taking image of white reference panel.

Once the cameras are calibrated, it is further contemplated that the calibration images will be stored for future radiometric image calibration. As will be appreciated by the skilled person, in many prior art applications this is a straightforward process, however in the context of the present invention this step must be undertaken while preserving the proper timing of the various switches and circuit architecture being employed.

In-Flight Mode

In embodiments where the present invention is employed in an UAV application, it is further contemplated that once each of the n cameras has been initialized and calibrated, the present invention can proceed to an in-flight mode of operation.

Figure 11:
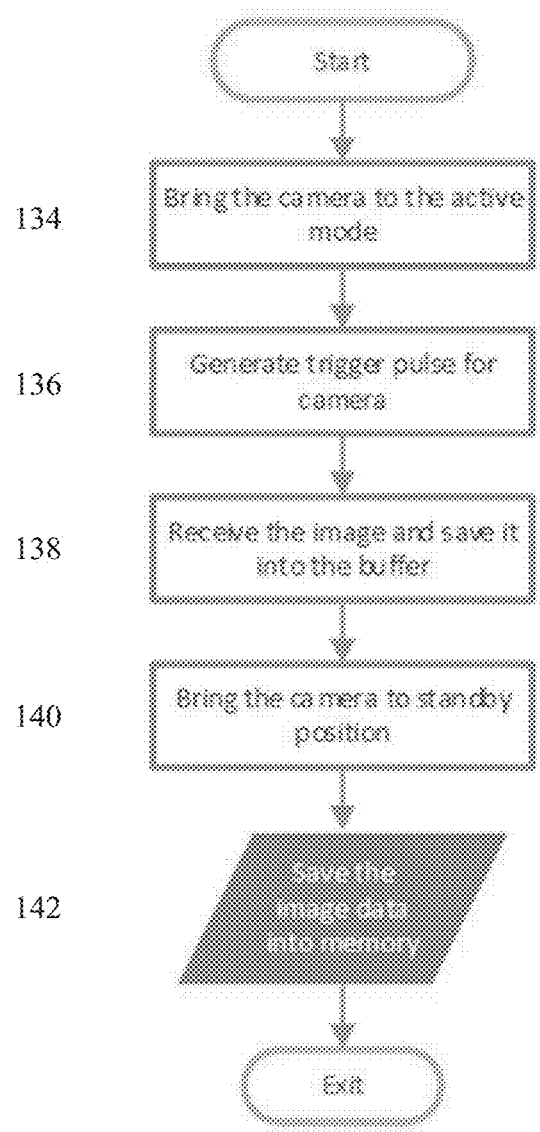
FIG. 11 is a flowchart of one embodiment of a procedure for obtaining an image in accordance with at least one embodiment of the present invention.

In this mode of operation and with reference to FIG. 11, the camera first will be brought out of standby position into an active mode 134 as discussed herein and a trigger pulse can be sent to a camera 136 and an image can subsequently be captured by that camera 138. The image can subsequently be stored into a devoted buffer and the camera can be subsequently reconfigured to a standby position 140 and the image data can be stored from buffer into memory 142.

Figure 12:
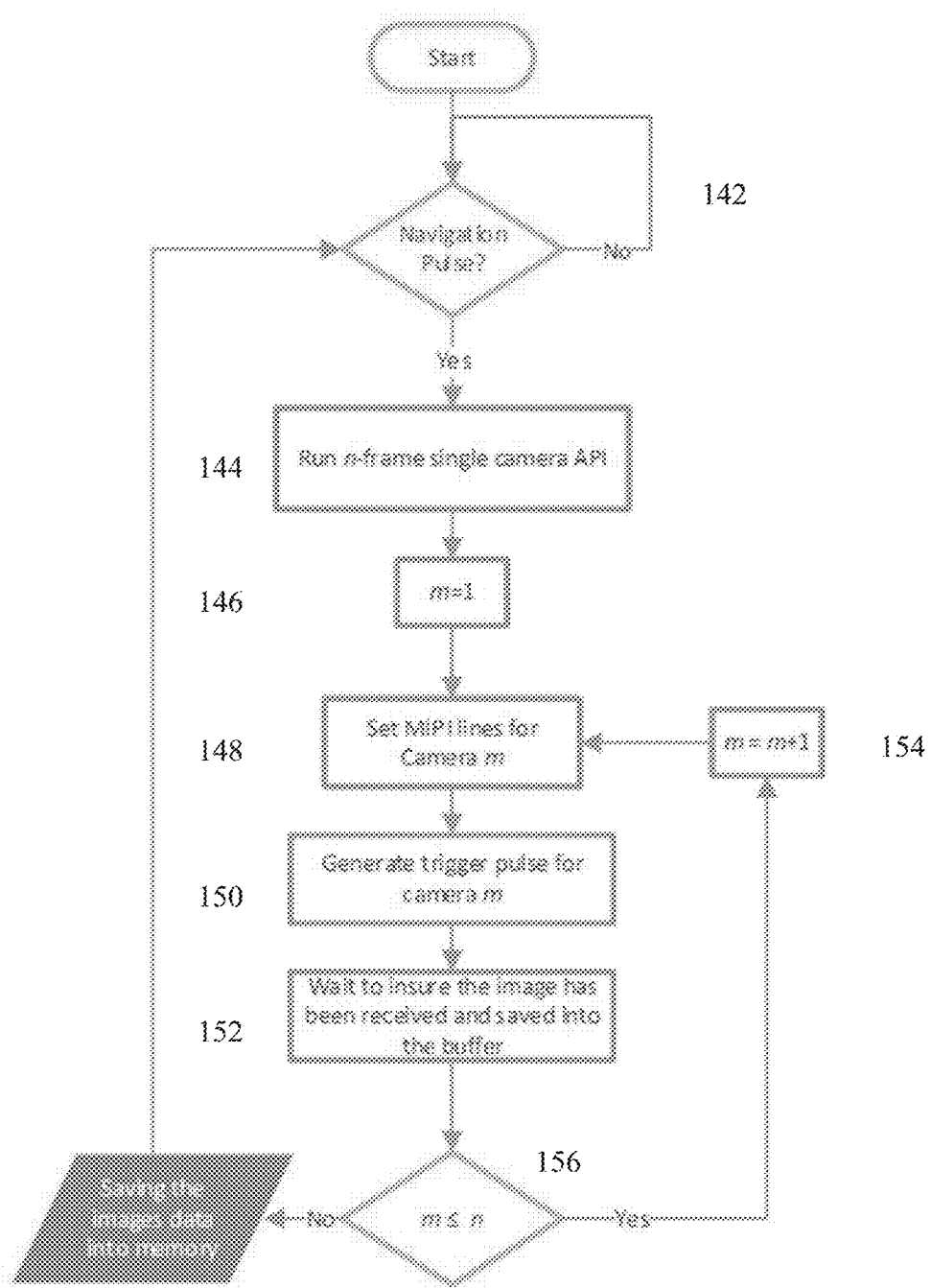
FIG. 12 is a flowchart of one embodiment of a procedure for obtaining n images in accordance with at least one embodiment of the present invention.

As will be appreciated by the skilled person and with reference to FIG. 12, when n cameras are present it is contemplated that n images will be captured and stored into a devoted buffer. In these embodiments it is contemplated that an n frame camera API terminates operation only after capturing the n frames and saving them in a devoted buffer that is sufficiently large to store at least n frames. It is contemplated that this camera API when used together with a proper switching and trigger signals coordinates the n cameras in suitable manner, as discussed in further detail herein.

More specifically, it is contemplated that the n frame camera API is run 144 for all n cameras. Consider it for camera m 146, the appropriate communication link is set to camera m 148, and a trigger pulse can be sent to camera m 150 and an image m can be captured by that camera m. This image m can subsequently be stored into a devoted buffer and once this step has been accomplished 152, the API will run the sequence again after setting the camera communication link to that of the subsequent camera (i.e. m+1) 154. It is contemplated that this process can repeated onwards to the nth camera 156. When the nth camera is reached, the n captured images can be stored from buffer into memory 158 and the API revert to the initial step where it can remain in active mode until the next main triggering signal is arrived.

In some embodiments, it is contemplated that the trigger signal can be generated from a navigation block of the UAV 142, or by the processing unit itself in a periodic way as discussed herein.

The embodiments described herein are intended to be illustrative of the present compositions and methods and are not intended to limit the scope of the present invention. Various modifications and changes consistent with the description as a whole and which are readily apparent to the person of skill in the art are intended to be included. The appended claims should not be limited by the specific embodiments set forth in the examples but should be given the broadest interpretation consistent with the description as a whole.

We claim:

1. A system for controlling a plurality of cameras in triggering mode to obtain a plurality of near identical images, the system comprising:
   a processing unit; and
   a plurality of cameras, each of the plurality of cameras in triggering mode,
   wherein the processing unit is electrically connected to each of the plurality of cameras by way of a trigger control signal link, a reset signal link, a switch control signal link, at least one communication signal link, an external clock control signal link and a camera control signal link, wherein at least one of the reset signal link and the at least one communication signal link is electrically connected to the processing unit by way of at least one switch arranged in a multiplexed format.

2. The system of claim 1, wherein at least one camera trigger signal link electrically connects at least one of the plurality of cameras to the processing unit by way of a shift register.

3. The system of claim 1, wherein at least one external camera clock signal link electrically connects at least one of the plurality of cameras to the processing unit by way of at least one shift register.

4. The system of claim 1 wherein the at least one communication signal link is selected from the group of: an image communication link and a setup communication link.

5. A system for controlling a plurality of cameras in video mode to obtain a plurality of near identical images, the system comprising:—
   a processing unit; and
   a plurality of cameras, each of the plurality of cameras in video mode,
   wherein the processing unit is electrically connected to each of the plurality of cameras by way of a start control signal link, a reset signal link, a switch control signal link, at least one communication signal link, an external clock control signal link and a camera control signal link,
      wherein at least one of the reset signal link and the at least one communication signal link is electrically connected to the processing unit by way of at least one switch arranged in a multiplexed format.

6. The system of claim 5, wherein at least one camera start signal link electrically connects at least one of the plurality of cameras to the processing unit by way of a shift register.

7. The system of claim 5, wherein at least one external camera clock signal link electrically connects at least one of the plurality of cameras to the processing unit by way of a shift register.

8. The system of claim 5 wherein the at least one communication signal link is selected from the group of: an image communication link and a setup communication link.

9. A method of controlling a plurality of cameras in triggering mode to obtain a plurality of near identical images, the method comprising the steps of:—
   synchronizing at least a first camera and at least a second camera using an external clock control signal link;
   generating at least a first trigger signal and a second trigger signal in response to a main trigger signal, the first trigger signal associated with a first camera in triggering mode and the second trigger signal associated with a second camera in triggering mode, the first trigger signal having a starting point and an ending point, the second trigger signal having a starting point and an ending point;
   receiving the first trigger signal over a first trigger signal link between the first camera and a processing unit;
   establishing a first image communication control signal associated with the first camera between the first camera and the processing unit over a first communication control signal link, the first image communication control signal having a starting point and an ending point;
   establishing a first exposure period associated with the first camera, first exposure period having a starting point and an ending point; and
   establishing a first data transmission link associated with the first camera between the first camera and the processing unit, the first data transmission link having a starting point and an ending point,
      wherein following the starting point of the first trigger signal, the starting point of the first image communication control signal, the starting point of the first exposure period and the starting point of the first data transmission link,
      receiving the second trigger signal; and
      establishing a second exposure period associated with a second camera prior to the ending point of the first communication control signal and the ending point of the first data transmission link;
   wherein the first camera and the second camera are each electrically connected to the processing unit by way of a trigger control signal link, a reset signal link, a switch control signal link, at least one communication signal link, the external clock control signal link and a camera control signal link,
   wherein at least one of the reset signal link and the at least one communication signal link is electrically connected to the processing unit by way of at least one switch arranged in a multiplexed format.

10. The method of claim 9, wherein at least one trigger signal link electrically connects at least one of the plurality of cameras to the processing unit by way of a shift register.

11. The method of claim 9, at least one external camera clock signal link electrically connects at least one of the plurality of cameras to the processing unit by way of at least one shift register.

12. The method of claim 9 wherein the at least one communication signal link is selected from the group of: an image communication link and a setup communication link.

13. A method of controlling a plurality of cameras in video mode to obtain a plurality of near identical images, the method comprising the steps of:—
   synchronizing at least a first camera and at least a second camera using an external clock control signal link;
   establishing a first image communication link between the first camera and a processing unit;—
   sampling a first frame from a first set of frames obtained by a first camera in video mode, the first frame corresponding to a first time;
   establishing a second image communication link between the second camera and the processing unit;
   sampling a second frame a second set of frames obtained by a second camera in video mode, the second frame corresponding to a first time;
   wherein the first time and the second time are sufficiently equivalent such that the first image is near identical to the second image,
   wherein the first camera and the second camera are each electrically connected to the processing unit by way of a start control signal link, a reset signal link, a switch control signal link, at least one communication signal link, the external clock control signal link and a camera control signal link, and
   wherein at least one of the reset signal link and at least one communication signal link is electrically connected to the processing unit by way of at least one switch arranged in a multiplexed format.

14. The method of claim 9, wherein at least one start signal link electrically connects at least one of the plurality of cameras to the processing unit by way of at least one shift register.

15. The method of claim 13, at least one external camera clock signal link electrically connects at least one of the plurality of cameras to the processing unit by way of at least one shift register.

16. The system of claim 15 wherein the image communication link is a MIPI link.

17. The system of claim 15 wherein the setup communication link is an I2C link.

18. The method of claim 13 wherein the at least one communication signal link is selected from the group of: an image communication link and a setup communication link.

19. The method of claim 16 wherein the image communication link is a MIPI link.

20. The method of claim 16 wherein the setup communication link is an I2C link.

* * * * *